United States Patent [19]

Evans et al.

[11] 3,830,639

[45] Aug. 20, 1974

[54] MANUFACTURE OF COLORED GLASS

[75] Inventors: Raymond H. Evans; David D. Myers, both of Yardley; Wilbur W. Hunt, Levittown, all of Pa.

[73] Assignee: The Calumite Company, Trenton, N.J.

[22] Filed: Jan. 16, 1974

[21] Appl. No.: 433,825

Related U.S. Application Data

[63] Continuation-in-part of Ser. No. 232,946, March 8, 1972, abandoned.

[52] U.S. Cl............................ 65/19, 65/134, 106/51
[51] Int. Cl............................................... C03c 5/02
[58] Field of Search............ 65/18, 19, 20, 22, 134; 106/51, 40 V

[56] References Cited
UNITED STATES PATENTS

| | | | |
|---|---|---|---|
| 1,962,270 | 6/1934 | Dunn | 106/51 |
| 2,829,959 | 4/1958 | Knuppel et al. | 106/51 X |
| 3,059,455 | 10/1962 | McNally | 65/19 |
| 3,326,702 | 6/1967 | Babcock | 65/134 X |
| R26,328 | 1/1968 | Monks | 106/51 X |

*Primary Examiner*—Robert L. Lindsay, Jr.
*Attorney, Agent, or Firm*—Sperry and Zoda

[57] ABSTRACT

Colored glass is produced from a mixture of glass making ingredients including boiler slag compositions which may contain little or no sulfur but contain substantial amounts of iron, manganese or other metals required to produce the desired glass colorants. In this way the amount of sulfide and sulfate compounds employed in the glass forming mix can be limited and a significant reduction in sulfur dioxide and other fumes and pollutants discharged from the glass making furnace is effected. At the same time the stability of the glass produced is improved and a greater uniformity in color is assured.

9 Claims, No Drawings

MANUFACTURE OF COLORED GLASS

RELATED APPLICATIONS

This application is a continuation-in-part of U.S. application Ser. No. 232,946 filed Mar. 8, 1972 now abandoned.

In the manufacture of glasses requiring the presence of iron and/or manganese to develop a colorant therein (hereinafter referred to as "colored glass") it has been usual heretofore to add small amounts of concentrated compounds wherein the iron is combined with sulfur or oxygen. Thus, for example, iron oxide, mill scale, pyrites, or iron sulfide have been added to the mixture of the glass making materials. The iron combines with sulfur derived from sulfide or sulfate additives in the batch to form iron or other stable metal sulfides which constitute the chromophore contained in the finished glass. Any excess sulfur not required to form the colorants, or retained as $SO_3$ in the finished glass, then must be expelled from the glass melt as sulfur dioxide. When a sulfate is used in combination with sulfur compounds in a glass forming mixture, it is generally employed in excess of the amount necessary to create good fining conditions in the glass melt in order to oxidize any excess sulfur in accordance with the equation $2\ SO_3 + S \longrightarrow 3\ SO_2$. In some instances oxidizing agents such as nitre ($NaNO_3$) may also be added to the glass making materials to oxidize the excess sulfur.

Sulfur dioxide, whether derived from sulfides or sulfates, must be expelled from the glass melt while the melt is in a relatively fluid condition in order to produce a stable glass product. This is necessary since if $SO_2$ is dissolved or otherwise present in the latter stages of the glass making process, when the glass is relatively viscous, gas bubbles will be entrapped in the glass forming "seeds" or blisters. On the other hand, the sulfur dioxide and other sulfur containing fumes developed at any time during the operation and discharged from the glass furnace seriously polute the atmosphere and become a health hazard.

It has been known heretofore that blast furnace slag may be used as an ingredient in a glass making mix and will reduce the formation of seeds and blisters in the glass by releasing the sulfur dioxide from the melt at an early stage of the glass making operation. (See U.S. Reissue Pat. No. 26,328). However, the amount of sulfur contained in blast furnace slags is relatively high compared with the amount of iron therein and therefore it is necessary to use relatively large amounts of gypsum, barytes, salt cake or other oxidizing agents in the mixture of glass making materials in order to oxidize the sulfur present in the slag and to oxidize the iron so as to convert it to a colorless ferric condition in the finished glass. Accordingly, as brought out in the Monks patent, blast furnace slag is recommended for use in the manufacture of colorless glass having a residual $SO_3$ content of 0.1 percent or more and such glass is ordinarily produced by developing an oxidizing condition in the glass melt.

In contrast with such practice the manufacture of amber glass is carried out in such a way that the amount of $SO_3$ retained in finished amber glass ordinarily is only about 0.02 percent to 0.10 percent and for this purpose it is necessary to develop a reducing condition in the glass melt during the glass making operation. Such reducing conditions also serve to improve the fining rate and permit the manufacture of a better quality of glass at a lower temperature and with reduced fuel usage.

Applicant's have discovered that boiler slag, which is essentially a relatively dilute form of iron silicate or complex $Fe_2O_3$ composition containing from about 5 to 50 percent of iron and from 0 to 5 percent of sulfur, can be used as the source of iron required to produce the desired chromophore in the manufacture of amber glass.

When boiler slag and blast furnace slag are both used in a mixture of glass making materials, the boiler slag may constitute the principal iron contributing constituent of the mixture, whereas the blast furnace slag may constitute the principal sulfur contributing constituent of the mixture. The amount of sulfate compounds then required to oxidize and eliminate any excess sulfur present in the mixture is materially reduced or eliminated and the discharge of $SO_2$ from the glass furnace is substantially reduced. Furthermore, when slags are used as the iron and sulfur contributing constituents of the batch, a further advantage is attained in that the iron and sulfur are presented in a dilute form facilitating mixing and distribution of the sulfur and iron throughout the batch of glass making materials and within the melt dispersion. Moreover, such distribution of the sulfur and iron throughout the glass making mixtures renders it possible to present the reactants including any sulfate, carbon, oxidizing agents or the like employed in substantially stoichiometrically calculated amounts in preparing the mixture of a glass making materials to be fused within the glass furnace. The chemical reactions which take place in the glass forming operation are accordingly simplified and as a result the operations are more readily controlled, the stability of the glass produced is improved and the cost of manufacture is reduced. Nevertheless, in some formulations of the glass forming mix pyrites, mill scale and the like may be used.

When using boiler slag as a constituent of a glass forming mix the amount of iron present in the batch and the color of the glass to be produced can be accurately predetermined and controlled whereas the amount of gypsum or other sulfate and oxidizing agents employed can be reduced. In addition the amount of sulfur dioxide generated and discharged as fumes from the furnace is reduced and the seeds and blisters in the finished glass is more readily controlled. Moreover, the cost of furnace slag is substantially less than that of pyrites, iron scale, and other iron or manganese containing additives heretofore required for producing the desired amount of iron or other stable sulfide chromophore to develop a predetermined color in the finished glass.

One typical boiler slag which may be used for this purpose has the composition which may be represented in percent by weight:

| | |
|---|---|
| Total Carbon | 0.06 |
| Titanium Oxide | 0.95 |
| Iron (FeO) | 23.05 |
| Iron ($Fe_2O_3$) | 4.45 |
| Phosphorous | 0.11 |
| Silica | 42.66 |
| Manganese | 0.04 |
| Aluminum Oxide | 20.97 |
| Calcium Oxide | 6.41 |
| Magnesium Oxide | 1.11 |
| Sulfate Sulfur | 0.15 |
| Moisture | 0.04 |

Other boiler slags have compositions within the following range in percent by weight:

| | |
|---|---|
| $SiO_2$ | 20 to 47% |
| $Al_2O_3$ | 3 to 35% |
| $Fe_2O_3$ | 5 to 50% |
| CaO | 0 to 20% |
| MgO | 0 to 50% |
| Alkali | 0 to 13% |
| $TiO_2$ | 0 to 3% |

In preparing the boiler slag for use it is preferably ground or reduced in size so that substantially all of the material will pass through a 16 mesh screen of the U.S. Standard Sieve Series. The material then may be passed over a magnetic separator to remove any metallic iron or magnetic material contained in the slag. As a result the boiler slag may be mixed readily with other constituents of the glass making batch so as to be uniformly dispersed therein. Thereafter during the melting of the batch the relatively low melting point of the slag aids in the mixing, distribution or solution of the slag in the melt.

The amount of the iron containing boiler slag employed in any glass making batch of materials may be varied greatly depending upon the color and other properties desired in the finished glass. Thus as little as 1 pound or as much as 100 pounds of boiler slag per ton of sand may be employed. In most operations from about 2 to 25 pounds of boiler slag are sufficient.

The amount of blast furnace slag, when used, may be as much as 20 percent based on the weight of the sand in the mix. The composition of the blast furnace slag may vary considerably and may contain up to about 5 percent by weight of sulfur. It is preferable to use a blend of blast furnace slags such as those produced in accordance with copending application Ser. No. 216,000. Typical products thus obtained have the following compositions in part by weight - represented as the oxides.

| | | |
|---|---|---|
| $SiO_2$ | 37.85 | 38.45 |
| $Al_2O_3 + TiO_2$ | 7.10 | 11.10 |
| CaO | 38.35 | 44.15 |
| MgO | 14.20 | 2.50 |
| $Fe_2O_3$ | 0.30 | 0.25 |
| MnO | 0.35 | 0.62 |
| $Na_2O + K_2O$ | 0.69 | 0.90 |
| $SO_3$ | 0.17 | 0.30 |
| S | 0.45 | 1.24 |

Such blast furnace slags may be used in amounts varying from about 0 to 400 pounds or more per ton of sand in the mixture of glass making materials.

The glass compositions produced in the practice of the present invention may be used in producing any type of glass requiring the presence of iron or iron compounds as chromophore therein. Typical of such products are flat glass, plate glass, container glass, tableware and other miscellaneous glass products.

In order to illustrate typical embodiments of the present invention and contrasts thereof with conventional procedure of the prior art, the following examples are cited.

EXAMPLE I

Two amber glass making batches were employed by way of comparison, the glass batch (A) being conventional whereas the glass batch (B) utilizes a high iron - low sulfur content boiler slag having the composition indicated above.

| | A (lbs.) | B (lbs.) |
|---|---|---|
| Sand | 2,000 | 2,000 |
| Soda Ash | 674.5 | 686 |
| Limestone | 523.4 | 523 |
| Syenite | 188.3 | 185 |
| Barytes | 22.4 | 22.4 |
| Salt Cake | 22.4 | 8.4 |
| Iron Pyrites | 5.17 | 4.0 |
| Carbon | 6.90 | 5.5 |
| Boiler Slag | — | 2.87 |

The glasses obtained from both mixes were substantially identical in color and had an $SO_3$ content of 0.02. However, the glass batch B required much less salt cake ($Na_2SO_4$) and less of the more expensive iron pyrites. As a result the amount of $SO_2$ produced and discharged to the atmosphere from the glass furnace was significantly reduced and the cost of the materials making up the batch was reduced.

EXAMPLE II

Two additional amber glasses were produced for comparison in each of which the same amount of blast furnace slag was used but it was possible to eliminate the salt cake ($Na_2SO_4$) of batch A altogether by employing boiler slag in the mix of batch B.

| | A (lbs.) | B (lbs.) |
|---|---|---|
| Sand | 2,000 | 2,000 |
| Soda Ash | 695 | 720 |
| Limestone | 344 | 343 |
| Syenite | 65 | 52 |
| Blast Furnace Slag | 200 | 200 |
| Salt Cake | 29.4 | — |
| Barytes | 22.4 | 22.4 |
| Iron Pyrites | 2.64 | 1.5 |
| Carbon | 6.55 | 1.0 |
| Boiler Slag | — | 12.4 |

The glasses thus obtained were identical in color while the amount of $SO_2$ produced and discharged to the atmosphere was greatly reduced. The $SO_3$ content of both glasses was below 0.02.

EXAMPLE III

Amber glasses were produced in further tests wherein the amount of high iron containing boiler slag was increased considerably and iron scale and iron pyrites eliminated from the batch while the amount of salt cake was reduced.

| | A (lbs.) | B (lbs.) |
|---|---|---|
| Sand | 2,000 | 2,000 |
| Soda Ash | 721 | 721 |
| Limestone | 262 | 292 |
| Blast Furnace Slag | 380 | 343 |
| Salt Cake | 26 | 18 |
| Iron Scale | 5.25 | — |
| Iron Pyrites | 1.0 | — |
| Boiler Slag | — | 23 |

The discharge of $SO_2$ from the furnace was materially reduced in melting batch B, whereas the relatively expensive iron scale and iron pyrites were replaced by the relatively inexpensive boiler slag.

It has further been found that high quality amber glasses can be produced when using boiler slag in combination with blast furnace slag without using any gypsum or other sulfate compound whatever in the mixture of glass making materials. Thus mixtures containing from about 600 to 800 pounds of soda ash per ton of sand, from about 150 to 500 pounds of limestone (Dolomitic and/or Calcitic), from about 150 to 350 pounds of blast furnace slag and from about 10 to 40 pounds of boiler slag serve to produce excellent amber glass. A small amount, say less than 1% by weight, of carbon in the form of glassmakers Grade Carbon or the like, is preferably also used in the mixture.

EXAMPLE IV

Two amber glasses were produced using the following mixtures in parts by weight:

|  | A | B |
| --- | --- | --- |
| Sand | 2,000 | 2,000 |
| Soda Ash | 717 | 715 |
| Limestone | 359 | 390 |
| Blast Furnace Slag | 27 | 240 |
| Gypsum | 17 | — |
| Iron Pyrites | 4 | — |
| Iron Oxide | 2.75 | — |
| Boiler Slag | — | 20 |
| Carbon | — | 0.5 |

The glasses produced were similar in color whereas no gypsum or other sulfate was used in the batch B and the expensive iron pyrites and iron oxide of batch A were eliminated by the use of a combination of boiler slag and an increased amount of the blast furnace slag. At the same time the discharge of $SO_2$ from the glass furnace was markedly reduced.

In using glass making mixtures as described above the degree of the amber color of the finished glass can be established by determining stoichiometrically how much sulfur present in the mixture is required to combine with the iron or manganese present to develop the chromophore level desired. In this way the operations can be controlled effectively and uniform end products can be produced.

It will be apparent from the foregoing examples that a very significant reduction in the discharge of $SO_2$ to the atmosphere in glass manufacturing operations can be effected while the cost of the iron containing materials employed can be reduced by using high iron containing and inexpensive boiler or furnace slags as the source of the iron colorant in the glass making batch of materials.

The batch may also contain various other constituents for the purpose of imparting particular properties to the glass being produced and the composition of the high iron containing slag employed may vary considerably. It should therefore be understood that the particular compositions and batch formulations cited above are intended to be illustrative only and are not intended to limit the scope of the invention.

We claim:

1. The method of producing colored glass having a residual $SO_3$ content not substantially exceeding about 0.1% and containing an iron-sulfur chromophore, which comprises melting a mixture of glass forming materials in a glass furnace, said mixture containing sand, from about 1 to 100 pounds per ton of sand of a boiler slag containing at least 5 percent by weight of iron and less than 5 percent by weight of sulfur, and a sulfur containing composition selected from the group consisting of blast furnace slag, metal sulfides and metal sulfates, the amount of said sulfur containing composition present in said mixture being approximately the stoichiometric equivalent of the iron present in said mixture and required to form said iron-sulfur chromophore.

2. The method as defined in claim 1 wherein said boiler slag contains from about 5 percent to 50 percent by weight of iron.

3. The method as defined in claim 1 wherein said sulfur containing material comprises a blast furnace slag containing up to about 5 percent by weight of sulfur.

4. The method as defined in claim 1 wherein said mixture of glass forming materials is substantially free of sulfate compounds.

5. The method as defined in claim 1 wherein the amount of boiler slag present in the mixture is from about 1 to 25 pounds per ton of sand present in the mixture.

6. The method as defined in claim 1 wherein said sulfur containing composition comprises a blast furnace slag and is present in an amount up to about 400 pounds per ton of sand present in the mixture.

7. The method as defined in claim 1 wherein said mixture contains from about 150 to 350 pounds of blast furnace slag and from about 10 to 40 pounds of boiler slag per ton of sand in the mixture and contains substantially no sulfate compounds.

8. The method as defined in claim 1 wherein said mixture consists essentially of sand, soda ash, limestone, blast furnace slag, boiler slag and carbon.

9. The method as defined in claim 1 wherein said mixtures has approximately the following composition in parts by weight:

| Sand | 2,000 |
| --- | --- |
| Soda Ash | 600 to 800 |
| Limestone | 150 to 500 |
| Blast Furnace Slag | 150 to 350 |
| Boiler Slag | 10 to 40 |
| Carbon | up to 1% of the total weight. |

* * * * *